I. A. SALMON.
Dental Instruments.
No. 5,623. Reissued Oct. 21, 1873.
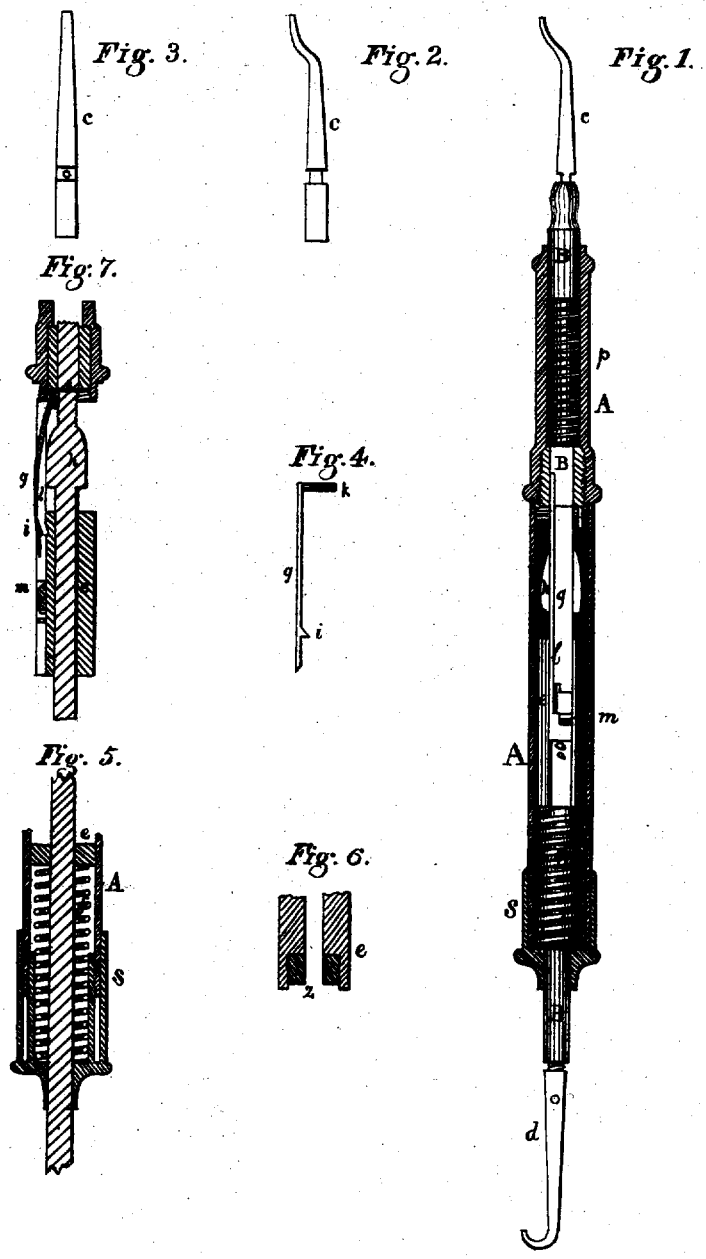
Witnesses
Mary Coleman.
W. F. Chaffee
Inventor
Ira A. Salmon
By A. H. & R. R. Evans
Attys.
AM. PHOTO-LITHOGRAPHIC Co. N.Y. (OSBORNE'S PROCESS)

UNITED STATES PATENT OFFICE.

IRA A. SALMON, OF BOSTON, MASSACHUSETTS.

IMPROVEMENT IN DENTAL INSTRUMENTS.

Specification forming part of Letters Patent No. 62,504, dated February 26, 1867; reissue No. 5,623, dated October 21, 1873; application filed October 11, 1873.

*To all whom it may concern:*

Be it known that I, IRA A. SALMON, of Boston, in the county of Suffolk and State of Massachusetts, have made a new and useful Improved Automatic Dental Mallet; and I do hereby declare the following to be a full, clear, and exact description of the nature, construction, and operation of the same, sufficient to enable one skilled in the art to which it appertains to construct and use the same, reference being had to the accompanying drawing, which is made part of this specification, and in which—

Figure 1 is a general longitudinal section, parts being shown in elevation, with a portion of the casing removed. Figs. 2 and 3 are elevations of one of the pluggers. Fig. 4 is a detached view of the spring whose catch lifts the hammer, the release of the catch permitting the hammer to drop under the impulse of the spring. Fig. 5 is an enlarged view of the parts involved in the regulation of the hammer-spring. Fig. 6 is a section of the hammer, showing its vulcanite face.

The instrument consists of a case containing a hammer, to the end of which a piece of hard rubber is secured, and which is raised by the engagement of a spring-catch on the spindle as the plugger in the latter is pressed against the metal filling in the tooth, the catch being disengaged at a certain point, and the spring-hammer being thrown down by a spring upon the shoulder of the spindle. The central spindle may have a plugger socketed in each end, one of which tools is operated by a thrust, and the other (being of a hooked shape) by a pull, the respective motions having a like effect upon the hammer, and upon the respective faces of the tools, which are presented in the same direction.

In the drawings, A A is the case, and B the spindle. The pluggers *c d* are socketed into the spindle, the former by being slipped in, and the latter by being screwed in. Slipping freely upon the spindle is a hollow cylinder, *e*, which forms a hammer when driven by the spring *f* against the shoulder *h* of the spindle. The hammer is raised by the engagement of the catch *i* of the spring-piece *g*, which is fastened by the socketing of its bent end *k* into the spindle B. The hammer *e* has a groove, in which lies the end of the spring *g*. To the lower part of the case is attached a rod, *l*, which, at its upper end, supports the hammer *e* by engagement with the pin in the groove, the inclined plane *m* acting as a trip to the spring *g*, throwing it outwardly, and disengaging the catch *i* from the hammer, which immediately descends under the impulse of the spring *f* upon the shoulder *h* of the spindle B, giving the required blow, and causing the face or point of the plugger to compact the metal in the cavity of the tooth under treatment.

The case A being held in the hand, the pressure of the plugger at the end of the spindle condenses the spring *p*, and, by the engagement of the catch *i* with the hammer, raises the latter and condenses the spring *f*. The spring-catch piece *g* lies in the groove of the hammer until its tapered end is pushed outwardly by the incline on the tripper *l*, which disengages the hammer, and allows it to descend, as before described.

The hammer in its normal state does not rest upon the anvil or shoulder *h*, but is sustained by the rod *l*, and the spindle projected so far as is permitted by a pin on the spindle, which engages with a shoulder in the case. The power of the spring *f* is regulated by the cap *s*, which may be screwed so far onto the cylindrical portion of the case as may be desirable. The further it is screwed on the more condensed and powerful will be the spring, and conversely.

Fig. 5 shows the construction of the cap-piece or regulator *s*. The inner cylinder of the regulator screws into the cylindrical portion of the case, the thread being covered by the external cylinder of the regulator, which, in the direct-action instruments, forms a cap or head. The hook-shaped plugger *d* is so attached to the spindle as to move with it on all occasions when attached, and is to be used in conjunction with the plugger *c* for plugging holes in teeth, whether posterior or anterior. The tool *d* is used by placing the hooked point against the gold and pulling from the tooth, while the tool *c* is pressed directly against the metal in the tooth, the hammer in the former case moving away from the tooth, and in the latter case moving toward the tooth, and in either case striking against the shoulder on the spindle, to one or both ends of which is secured a plugger. The cap and cylindrical portion of the case being removed, all the interior working portions are displayed, and remain attached to the central spindle, exposed for examination or repair. The vulcanite or vulcanized rubber *z* on the striking end of the hammer prevents the sharp concussion of metal on metal.

I make no claim to the invention described in the United States Patent No. 50,633; but

What I claim as my invention is—

1. A combination composed of the hook, or its equivalent, the spindle, the hammer, and mechanism, substantially as described, or its equivalent, for operating such hammer, as and for the purpose set forth.

2. The combination as well as the arrangement of the direct-pressure and back-action pluggers with the hammer, its case, and mechanism for operating such hammer, substantially as and for the purpose specified.

3. The construction and arrangement of the trip *l*, spring-catch *g*, shoulder *h*, hammer *e*, spindle B, and incline *m*, permitting the case covering them to be removed without disturbing their relative positions, and this independent of the back-action plugger, substantially as set forth.

IRA A. SALMON.

Witnesses:
A. K. P. JOY,
WM. H. STUBLE.